(12) United States Patent
Craig

(10) Patent No.: US 6,410,683 B1
(45) Date of Patent: Jun. 25, 2002

(54) POLYMER DEVOLATILIZATION PROCESS

(75) Inventor: Thomas Orr Craig, Cheshire (GB)

(73) Assignee: Nova Chemicals Europe Limited (GB)

( * ) Notice: Subject to any disclaimer, the term of this patent is extended or adjusted under 35 U.S.C. 154(b) by 0 days.

(21) Appl. No.: 09/513,636

(22) Filed: Feb. 25, 2000

(30) Foreign Application Priority Data

Mar. 3, 1999 (GB) .............................. 9904897

(51) Int. Cl.⁷ .................................. C08F 6/00
(52) U.S. Cl. ...................... 528/480; 528/499
(58) Field of Search ................. 528/480, 499

(56) References Cited

U.S. PATENT DOCUMENTS 5,380,822 A    1/1995   Skilbeck

FOREIGN PATENT DOCUMENTS

EP          0 583 082 A1    2/1994
EP          0 798 314 A1    10/1997

OTHER PUBLICATIONS

T.O. Craig, Application of an Enhanced Flash–Tank Devolatilization System to a Degassing Extruder, Advances in Polymer Technology, vol. 10, No. 4, 323–325 (1990).
C. Darribere, F.A. Streiff, J.E. Juvet, Static Devolatilization Plants; Dechema Monographs vol. 134—Wiley–VCH Verlag GmbH, 1998 pp. 689–704 (6th Internation Workshop, Berlin, 1998).

Primary Examiner—Terressa M. Boykin
(74) Attorney, Agent, or Firm—Kenneth A. Johnson

(57) ABSTRACT

A process for the removal of impurities from a thermoplastic polymer, comprising mixing with the polymer in a molten state a stripping agent comprising a solution of carbon dioxide in water, passing the mixture to a vessel held at a pressure and which is less than atmospheric pressure, allowing impurities to defuse out of the polymer into the volatilised stripping agent, and removing the volatilised stripping agent with the impurities from the mixture. The invention also relates to the stripping agent itself, which is a solution of carbon dioxide in water.

8 Claims, 1 Drawing Sheet

POLYMER DEVOLATILIZATION PROCESS

FIELD OF THE INVENTION

This invention relates to a process for the devolatilisation of polymers, more particularly to an improved process for the removal of volatile impurities from thermoplastic polymers.

BACKGROUND OF THE INVENTION

In the manufacture of a wide variety of polymers it is common for them to contain impurities which are unwanted in final products made from the polymers. Such impurities typically include residual monomer, solvents that may be used in the preparation of polymer, and low molecular weight organic species such as dimers and trimers that may be formed during the polymerization process.

An important field to which the present invention is particularly, though not exclusively directed is the preparation of polymers and copolymers of styrene made by a continuous mass polymerization process, in which it is desirable to produce polymer products having a residual styrene monomer content below 150 ppm and whose content of oligomeric species, e.g. styrene dimer is also minimized. Such products are useful for the manufacture of food packaging where migration of residual monomer from the polymer into the food can cause problems of undesirable odor, and/or flavor (taint).

In known devolatilisation processes a molten polymer is admixed with a small amount of an inert volatile substance known as a stripping agent. Known stripping agents include water, methanol and carbon dioxide. The resultant mixture is pumped through a distributor pipe into a heated vessel held at a reduced pressure, which causes the added volatile substance to produce a large population of bubbles in the molten polymer mass. This promotes diffusion of volatile impurities out of the molten polymer and this is enhanced by the high surface area of the resultant foaming mass. An example of an arrangement for carrying out the above devolatilisation process is disclosed in the article by T. O. Craig entitled "Application of an Enhanced Flash-Tank Devolatilisation System to a Degassing Extruder", Advances in Polymer Technology, Volume 10, No. 4 (1990), pages 323 to 325.

Other known polymer devolatilisation processes are disclosed for example in U.S. Pat. No. 5,380,822 and published European Patent Application EP-A-0583082.

The admixing of the stripping agent into the molten polymer can be carried out in an extruder, or more preferably in a static mixer. The objective is to dispersively mix the stripping agent finely in the molten polymer upstream of the reduced pressure vessel (known as the devolatiliser). Such mixing is a difficult task, because the viscosity of the stripping agent may typically be a millionth of the viscosity of the molten polymer mass, and in addition sufficient pressure must be maintained during the mixing step to ensure that premature vaporization of the stripping agent does not occur. Such premature vaporization leads to slugs of stripping agent vapor in the mass and reduces the efficiency of the devolatilisation process.

The use of water as a stripping agent for various polymers is widely practiced in the art. It is known that the effectiveness of admixed water as a stripping agent does not always increase with the amount of water used. When the admixed water is added at a level that is more than 20 times (by weight of the total composition) the level of residual styrene present, its effectiveness diminishes markedly. The effect is attributed to the cooling and concomitant increase in mass viscosity caused by flashing of the water from an initial dispersed liquid droplet form to a vapor. This is discussed in the paper by Darribere, Streiff and Juvet, "Static Devolatilisation Plants", presented at the $6^{th}$ International Workshop on Polymer Reaction Engineering, Berlin, 1998.

The use of carbon dioxide in its supercritical state as a stripping agent in polymer devolatilisation is also known, as disclosed for example in published European Patent Application EP-A-0798314. Carbon dioxide is particularly attractive as a stripping agent since under supercritical conditions it is partially soluble in molten polystyrene (and other polymers) and this solubility enhances the effect of carbon dioxide ($CO_2$) on the removal of impurities from the polymer. However, the admixing of carbon dioxide into the molten polymer requires very high pressures and intensive mixing to prevent formation of vapor slugs and the attendant disadvantages described below.

Furthermore, because of its extremely low viscosity at elevated temperatures and pressures, the creation of a fine dispersion of carbon dioxide in a molten polymer is difficult. EP-A-0798314 teaches that the amount of carbon dioxide admixed into the polymer must exceed the amount of residual monomer present for the process to work satisfactorily, and that addition of a nucleating agent to the polymer is particularly preferred. Such nucleating agents may however adversely affect the properties of the polymer, especially where clarity is important.

A further disadvantage in using carbon dioxide as a stripping agent comes from the fact that it is a non-condensable gas and therefore places an additional volumetric pumping duty on the vacuum source that is used to maintain reduced pressure in the devolatiliser vessel. This means that the vacuum pumps need to be larger and more expensive than would be the case if water were used as the stripping agent.

The present invention seeks to ameliorate the disadvantages of the known polymer devolatilisation techniques discussed above, whilst combining the advantages of using water and carbon dioxide as stripping agents in polymer devolatilisation.

SUMMARY OF THE INVENTION

Figure 1:
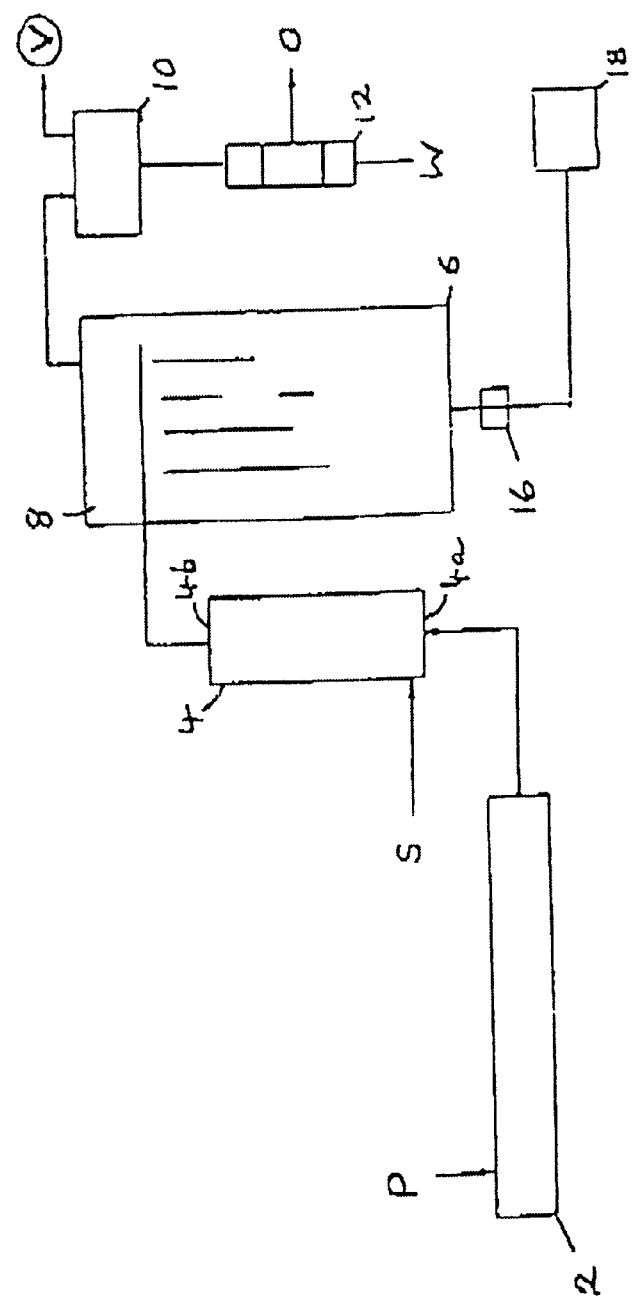
FIG. 1 is a schematic form of the typical apparatus suitable for carrying out the devolatilisation method of this invention.

In a first aspect the present invention provides a process for the removal of impurities from a thermoplastic polymer, comprising mixing with the polymer in a molten state a solution of carbon dioxide in water, passing the mixture to a vessel held at a pressure which is less than atmospheric pressure and preferably between about 1 and 30 mmHg ($1.333 \times 10^2$ to about $4 \times 10^3$ Pa), allowing impurities to diffuse out of the polymer into the volatilised stripping agent, and removing the volatilised stripping agent with the impurities from the mixture.

In a second aspect the present invention provides the use of a solution of carbon dioxide in water as a stripping agent in the devolatilisation of polymers.

In a third aspect, the invention provides a stripping agent for use in the devolatilisation of polymers, which stripping agent comprises a solution of carbon dioxide in water.

DETAILED DESCRIPTION OF THE INVENTION

The present invention is based on the surprising finding that the effect of using a carbon dioxide solution in water as the stripping agent is more beneficial than the separate impurity-reducing effects of using water and carbon dioxide alone as separate stripping agents in the molten polymer.

The manner of introduction of stripping agent in the carrying out of the invention is preferably by use of a static mixer. As the hydraulic pressure decreases from the inlet to the outlet end of the static mixer, the carbon dioxide-water solution flashes to yield a series of vapor bubble populations that are progressively richer in carbon dioxide going along the mixer and are in equilibrium with corresponding liquid droplets that are progressively richer in water.

In the practicing of the method of the invention, it is preferred that the reduced pressure vessel into which the mixture of polymer and carbon dioxide-water stripping agent is fed from the outlet end of the static mixer is held at a pressure in the range 1 to 30 mmHg ($1.333 \times 10^2$ to about $4 \times 10^3$ Pa). Typically the process will be carried out at a pressure of about 20 mmHg ($26.66 \times 10^2$ Pa) or less (e.g. 1 to 20 mmHg(torr) ($1.333 \times 10^2$ to $26.66 \times 10^2$ Pa)). (1 mmHg=1 torr=$1.333 \times 10^2$ Pa).

Typically, the temperature of the process, and this of the molten polymer, will be in the range of 200 to 300° C., preferably from 220 to 270° C., most preferably about 240° C. (e.g. 230 to 250° C.).

The carbon dioxide solution which constitutes the stripping agent in the invention is preferably a solution of carbon dioxide dissolved in water in an amount of from 0.1 to 10% by weight (based on the total weight of the solution), more preferably from 0.5 to 5.0% by weight, typically about 1.0% by weight (e.g. 0.5 to 1.5% by weight). Such carbon dioxide solutions may be prepared by means of any suitable technique as known and widely practiced in the art.

The present invention is applicable particularly to the devolatilisation of polymers and copolymers of styrene. Such polymers commonly have residual monomer contents which require lowering in order to be suitable for many practical applications.

Typically the polymer melt is a melt of one or more polymers selected from the group of polymers including polystyrene, high impact polystyrene (HIPS), styrene acrylonitrile polymers (SAN), acrylonitrile butadiene styrene polymers (ABS), styrene methyl methacrylate polymers, styrene methyl methacrylate polymers (MBS), and one or more of the aforesaid polymers, most preferably high impact polystyrene blended with polyphenylene oxide. However, the process of the present invention could be used in association with other polymers such as polyamides (e.g. nylons) and aromatic polyesters such as polyethylene terephthalate and polybutylene terephthalate.

Generally, the polymers which may be treated in accordance with the present invention comprise:
  (i) from 100 to 30, preferably from 100 to 50, most preferably from 100 to 70 weight % of one or more monomers selected from the group consisting of $C_{8-12}$ vinyl aromatic monomers which are unsubstituted or substituted by a $C_{1-4}$ alkyl radical; and
  (ii) from 0 to 70, preferably 0 to 50, most preferably from 0 to 30 weight % of one or more monomers selected from the group consisting of $C_{1-4}$ alkyl esters of acrylic or methacrylic acid; acrylonitrile and methacrylonitrile; and in the case of the most preferred range maleic anhydride (i.e. SMA polymers typically comprise from 5 to 25, preferably from 5 to 15 weight % of maleic anhydride and the balance of one ore more of the above vinyl aromatic monomers, most preferably styrene); which polymers may be grafted on to from 0 to 40, preferably from 0 to 20 weight % of one or more rubbery polymers selected from the group consisting of one or more $C_{4-6}$ conjugated diolefin monomers and polymers comprising from 20 to 80, preferably from 40 to 60 weight % of one or more $C_{8-12}$ vinyl aromatic monomers and from 80 to 20, preferably from 60 to 40 weight % of one or more $C_{4-6}$ conjugated diolefins.

Suitable vinyl aromatic monomers include styrene, alpha-methyl styrene, and p-methyl styrene. Suitable esters of acrylic or methacrylic acid include methyl methacrylate, ethyl methacrylate, methyl acrylate, ethyl acrylate, and butyl acrylate. Suitable conjugated diolefin monomers include butadiene and isoprene. Most preferably the polymer melt is polystyrene or high impact polystyrene (HIPS).

The present invention has been described in terms of the devolatilisation of a polymer melt of polystyrene. However, the present invention may also be used in association with melts of other polymers such as acrylonitrile butadiene styrene polymers (ABS), styrene acrylonitrile polymers (SAN), styrene maleic anhydride (SMA) and polymer blends. The present invention is particularly useful where polymers are solution blended. That is, miscible solutions of two polymers are mixed and the solvent(s) is/are removed. In such cases, it is often desirable to remove the solvent(s) to as low a level as possible.

One commercially available blend in which the present invention may be useful is a blend of polyphenylene oxide and polystyrene or a blend of polyphenyleneoxide and high impact polystyrene. Typically, the weight ratio of polystyrene to polyphenylene oxide is from 90:10 to 10:90, preferably from 70:30 to 10:90.

The method of the invention can be carried out using any suitable known apparatus. An example is that disclosed in the article by T. O. Craig in Advances in Polymer Technology, Volume 10, No. 4 (1990), pages 323 to 325 cited hereinabove, the disclosure of which article is incorporated herein by reference.

In preferred embodiments of the invention, a reduction in impurity contents, especially that of residual monomer, typically down to below 150 ppm, preferably 100 ppm, most preferably below 75 ppm is possible. Levels of impurities are readily measurable by means of gas chromatography, as is well known to persons skilled in the art. As used herein, the expression "ppm" means parts per million based on the total composition in question.

By way of example only, preferred embodiments of the present invention is its various aspects, together with illustration of its advantages, will now be described in detail, with reference to the accompanying drawings in which:

FIG. 1 is a schematic view of a typical devolatilisation apparatus for use in practicing the method of the invention.

Referring to FIG. 1, this drawing shows in schematic form a typical apparatus suitable for carrying out the devolatilisation method of the invention. It comprises an extruder 2 connected to a static mixer 4, which is itself connected to a flash tank (i.e. devolatilisation vessel or a falling strand devolatiliser) 6. The inlet end 4a of the static mixer 4 is provided with an injection valve through which the stripping agent can be delivered by a suitable metering pump. Suitable examples of injection valves and metering pumps are well known in the art. The outlet end 4b of the static mixer 4 is connected to a perforated distributor pipe 8 extending into the flash tank 6. The flash tank 6 is maintained at reduced pressure, e.g. 20 mmHg ($26.66 \times 10^2$ Pa), by a vacuum pump V acting through a condenser 10 which condenses volatile impurities removed from the polymer, as well as all or some of the condensable components of the stripping agent.

Polymer from which impurities are to be removed is introduced into the system at point P and the stripping agent is injected continuously into the polymer stream at point S. The extruder 2 converts the introduced polymer into a molten mass typically in the temperature range 200 to 270° C. and the pressure at the inlet end 4a of the static mixer 4 is typically about 15 Mpa (150 barg). In a commercial polymerization where the polymer is molten, the extruder may not be necessary or replaced with a high pressure pump. The molten mixture of polymer and stripping agent is fed through the static mixer typically at a rate of about 100 kg/hr at a temperature of around 240° C.

Having exited the static mixer 4, the polymer and stripping agent mixture is fed to the flash tank 6 which is maintained at the above mentioned reduced pressure and it is in the flash tank 6 and the perforated distributor pipe 8 that the devolatilisation takes place and the impurities are removed from the polymer. The treated polymer exits the flash tank 6 via gear pump 16 to strand die and pelletiser 18.

The extruder barrel 2, static mixer 4 and flash tank 6 are all jacketed with heat transfer oil capable of maintaining controlled temperatures of up to about 250° C.

Use of the above apparatus for carrying out the devolatilisation process of the invention is further illustrated by the following Examples.

EXAMPLE 1

The above described apparatus was used to remove residual styrene monomer from pellets of crystal polystyrene having a melt flow index of 2.0 g/10 minutes (5 kg/load, 200° C.) and a residual styrene monomer content of 800 ppm. The polystyrene was converted to a molten mass in the extruder and fed at a rate of 100 kg per hour through the static mixer at a temperature of 240° C. The pressure at the inlet of the static mixer was 15 Mpa (150 barg). The stripping agent used was a 1.0% by weight solution (based on the total weight of solution) of carbon dioxide in water, which was injected continuously into the molten polymer stream at a rate of 1.0% by weight of the polymer flow rate. The pressure in the flash tank was held at 20 mmHg ($26.66 \times 10^2$ Pa).

Polystyrene polymer removed from the system having undergone devolatilisation and pelletising was found to have a residual styrene monomer content (measured by means of gas chromatography) of 50 ppm.

EXAMPLE 2 (Comparative)

The procedure of Example 1 was repeated but instead using water alone, i.e. with no dissolved carbon dioxide, as the stripping agent. The residual styrene monomer content in the devolatilised polymer was found to be 150 ppm.

EXAMPLE 3 (Comparative)

The procedure of Example 1 was repeated except that deaerated water, i.e. without any dissolved carbon dioxide, was used as the stripping agent. The residual styrene monomer content in the devolatilised polymer was found to be 160 ppm.

EXAMPLE 4 (Comparative)

The procedure of Example 1 was repeated but instead of using 1.0% by weight (based on the weight of polymer) of carbon dioxide alone (with no water) as the stripping agent. The residual styrene monomer content in the devolatilised polymer was found to be 160 ppm.

EXAMPLE 5 (Comparative)

The procedure of Example 1 was repeated but using 0.1% by weight (based on the weight of polymer) of carbon dioxide alone (with no water) as the stripping agent. The residual styrene monomer content in the devolatilised polymer was found to be 500 ppm.

EXAMPLE 6 (Comparative)

The procedure of Example 1 was repeated but using no injected stripping agent at all. The residual styrene monomer content in the treated polymer was found to be 500 ppm.

What is claimed is:

1. A process for the removal of impurities from a thermoplastic polymer, comprising mixing with the polymer in a molten state a stripping agent comprising a solution of carbon dioxide in water, passing the mixture to a vessel held at a pressure in the range of 1 to 30 mmHg ($1.333 \times 10^2$ to about $4 \times 10^3$ Pa) allowing impurities to diffuse out of the polymer into the volatilized stripping agent, and removing the volatilized stripping agent with the impurities from the mixture.

2. A process according to claim 1, wherein the stripping agent is mixed with the polymer by use of a static mixer.

3. A process according to claim 2, wherein the temperature of the molten polymer, and at which the process is conducted, is in the range of 200 to 300° C.

4. A process according to claim 3, wherein the polymer is a polymer or copolymer of styrene.

5. A process according to claim 4, wherein the polymer comprises;

(i) from 100 to 30 weight % of one or more monomer units selected from the group consisting of $C_{8-12}$ vinyl aromatic monomers which are unsubstituted or substituted by a $C_{1-4}$ alkyl radical; and (ii) from 0 to 70 weight % of one or more monomer units selected from the group consisting of $C_{1-4}$ alkyl esters of acrylic or methacrylic acid, acrylonitrile, methacrylonitrile, or (in the case where this component (ii) is present in an amount of from 0 to 30 weight %) maleic anhydride.

6. A process according to claim 5, wherein the polymer is grafted onto from 0 to 40 weight % of one or more rubbery polymers selected from the group consisting of one or more $C_{4-6}$ conjugated diolefin monomers and polymers comprising from 20 to 80 weight % of one or more $C_{8-12}$ vinyl aromatic monomers and from 80 to 20 weight % of one or more $C_{4-6}$ conjugated diolefins.

7. A process according to claim 6, in which the level of residual monomer in the polymer is reduced to below 150 ppm.

8. A stripping agent for use in the devolatilization of polymers, which is carbon dioxide dissolved in the water in an amount of from 0.1 to 10% by weight (based on the total weight of the solution).

* * * * *